United States Patent
Hwang et al.

(10) Patent No.: US 6,659,420 B2
(45) Date of Patent: Dec. 9, 2003

(54) MANUAL AND AUTOMATIC FLOW CONTROL VALVE

(76) Inventors: Tsang-Chang Hwang, 5F, No. 65, Fwu-Kuo Rd., Shih Lin, Taipei (TW); Kuo-Chou Lee, No. 93, Shang-Jen St., Noan Noan, Keelung City (TW); Chi-Chin Hsu, 4F, No. 18, Alley 40, Lane 216, Sec. 4, Chung Hsiao E. Rd., Taipei (TW)

(*) Notice: Subject to any disclaimer, the term of this patent is extended or adjusted under 35 U.S.C. 154(b) by 40 days.

(21) Appl. No.: 10/101,587

(22) Filed: Mar. 21, 2002

(65) Prior Publication Data

US 2003/0178591 A1 Sep. 25, 2003

(51) Int. Cl.⁷ .............................................. F16K 31/12
(52) U.S. Cl. ...................... 251/26; 251/30.03; 251/40; 4/DIG. 3
(58) Field of Search .................. 251/26, 40, 30.05, 251/30.03, 30.02, 30.01; 4/DIG. 3, 623, 302, 304, 305

(56) References Cited

U.S. PATENT DOCUMENTS

| | | | | |
|---|---|---|---|---|
| 5,125,621 A | * | 6/1992 | Parsons et al. | 251/30.03 |
| 5,244,179 A | * | 9/1993 | Wilson | 251/30.03 |
| 6,019,343 A | * | 2/2000 | Tsai | 251/40 |
| 6,161,814 A | * | 12/2000 | Jahrling | 4/623 |
| 6,382,586 B1 | * | 5/2002 | Wilson et al. | 251/40 |

* cited by examiner

*Primary Examiner*—John Bastianelli
(74) *Attorney, Agent, or Firm*—Bacon & Thomas, PLLC

(57) ABSTRACT

A manual and automatic flow control valve includes a valve body, a manual control unit, a hollow pressure-releasing device, a middle plate, an upper casing, and an electric controlled magnetic unit. The internal of the valve body has a water inlet chamber and a water outlet chamber. A plastic main water flow valve is formed therebetween for isolating the two pressure chambers. A hollow pressure-releasing device is installed in a hollow portion of a main water flow valve. An upper side of the main water flow valve is a middle plate which is installed with an upper pressure chamber. The manual control unit can push the hollow pressure-releasing device to tilt. The electric controlled magnetic unit can control the hollow pressure-releasing device to communicate with the upper pressure chamber. If water drains from the lower pressure chamber, the water will push away the main water flow valve.

7 Claims, 6 Drawing Sheets

MANUAL AND AUTOMATIC FLOW CONTROL VALVE

BACKGROUND OF THE INVENTION (a) Field of the Invention

The present invention relates to control valves, and particularly to a manual and automatic flow control valve, wherein the manual and automatic flow control valve can be used in a urinal or a faucet. The manual and automatic flow control valve of the present invention has a simple structure and can be updated easily.

(b) Description of the Prior Art

Referring to FIG. 1, a prior art flush device of a urinal includes a valve body 10, a main water flow valve 20, a pressure releasing rod 30, an upper cover 40 and a manual control unit 50. One side of the valve is installed with a water inlet chamber 101 which is bent and then extends upwards. The lower side thereof is vertically installed with a water outlet chamber 102. An upper end of the water outlet chamber 102 is vertically protruded to the upper end of the water inlet chamber 101. The two chambers are communicated above an upper end of the valve body and are sealed by an upper cover 40. The main water flow valve 20 is a hollow cylinder made of plastics and an upper end thereof has a film 201 thereaound. One or at least one penetrating holes 202 are formed on the film. The film 201 runs across and seals the upper opening of the water outlet chamber 12 for separating the water outlet chamber 102 and water inlet chamber 101. An upper side thereof is formed with a pressure chamber A. The pressure releasing rod 30 is a vertical rod an upper end of which is formed with a valve piece 301. The valve piece passes through the main water flow valve 20. Thereby, the upper valve piece 301 will seal the hole at the middle section of the main water flow valve 20 and a lower end thereof extends to protrude out of the lower end of the main water flow valve 20. As a result, the water flow of water inlet channel A can flow through a small hole 202 of the film 201. Thereby, the pressures of the water inlet chamber 101 and the pressure chamber A are balanced and the film 201 will resist water flow. When the manual control unit 50 of the valve body 10 pushes the pressure releasing rod 30 to tilt, the water of the pressure chamber A will fall out and the water inlet chamber 101 will push away the film 201. Thereby, the prior art can be used in the prior art urinal or faucet.

The above mentioned prior art structure is manual controlled, while it is often that the user forgets to flush water and thus the next user will feel uneasy. Therefore, a manual and automatic controlled urinal flush device for being used in schools, bus stations, departments, or other public places. This prior art design must update the whole structure of the valve and the internal components of the urinal flush device. Therefore, the prior art urinal flush device must be detached. Otherwise, it can not be updated. However, this is a large burden to the user, especially to the schools, bus stations, departments, or other public places.

SUMMARY OF THE INVENTION

Accordingly, the primary object of the present invention is to provide a manual and automatic flow control valve including a valve body, a manual control unit, a hollow pressure-releasing device, a middle plate, an upper casing, and an electric controlled magnetic unit. The internal of the valve body has a water inlet chamber and a water outlet chamber. A plastic main water flow valve is formed between an upper end of the water inlet chamber and the water outlet chamber for isolating the two pressure chambers. A hollow pressure-releasing device is installed in a hollow portion of a main water flow valve, which extends downwards. An upper side of the main water flow valve is a middle plate. An upper side of the middle plate is installed with an upper pressure chamber which is communicated with a lower pressure chamber and the hollow pressure-releasing device. Thereby, the manual control unit can push the hollow pressure-releasing device to tilt. The electric controlled magnetic unit can control the hollow pressure-releasing device to communicate with the upper pressure chamber. If water drains from the lower pressure chamber, the water will push away the main water flow valve.

The various objects and advantages of the present invention will be more readily understood from the following detailed description when read in conjunction with the appended drawing.

DETAILED DESCRIPTION OF THE PREFERRED EMBODIMENTS

Figure 1:
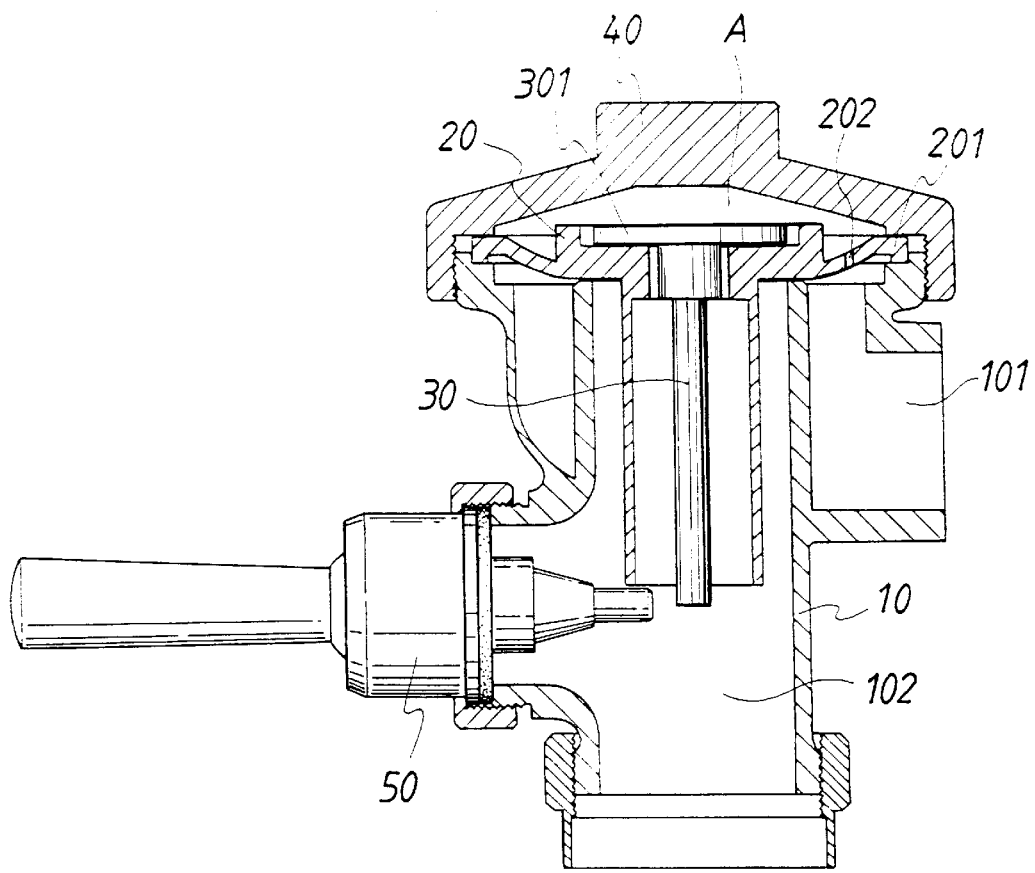
FIG. 1 is a cross section view of a prior manual and automatic flow control valve.
Figure 2:
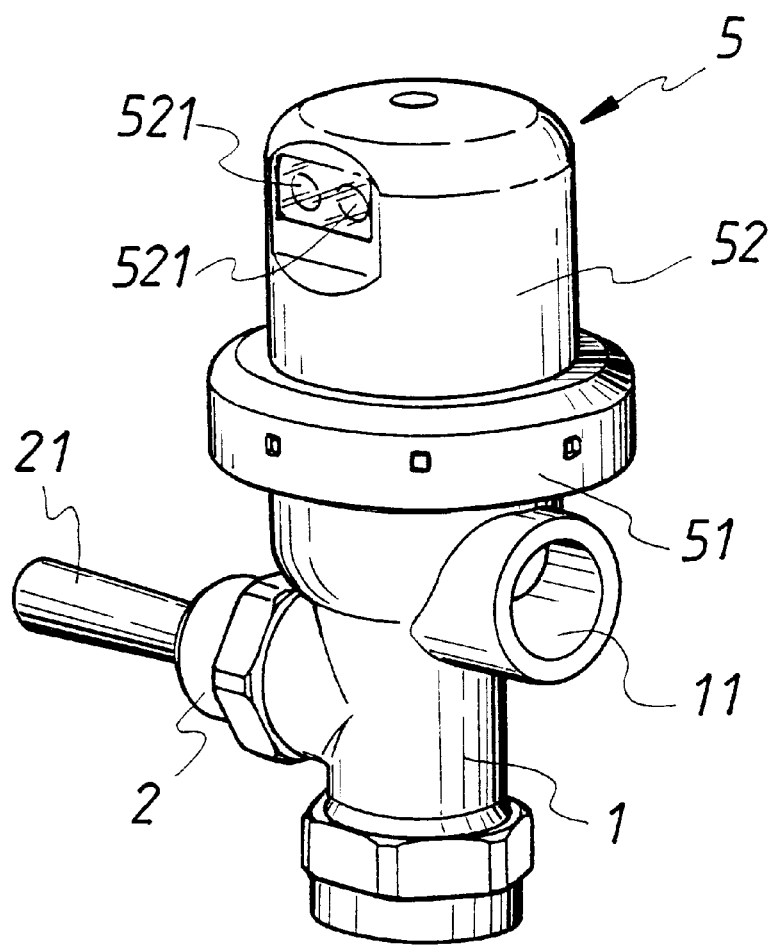
FIG. 2 is a perspective view of the manual and automatic flow control valve of the present invention.
Figure 3:
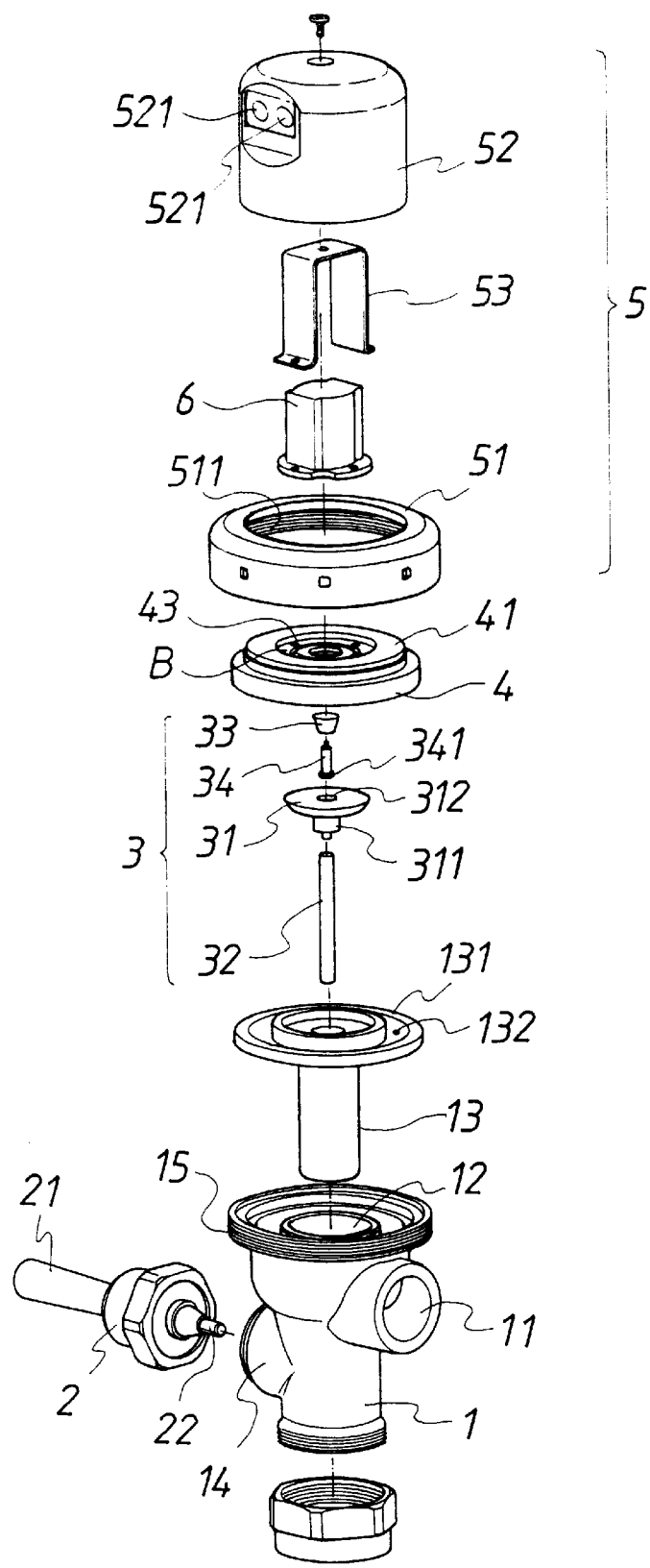
FIG. 3 is an exploded perspective view showing the components of the present invention.
Figure 4:
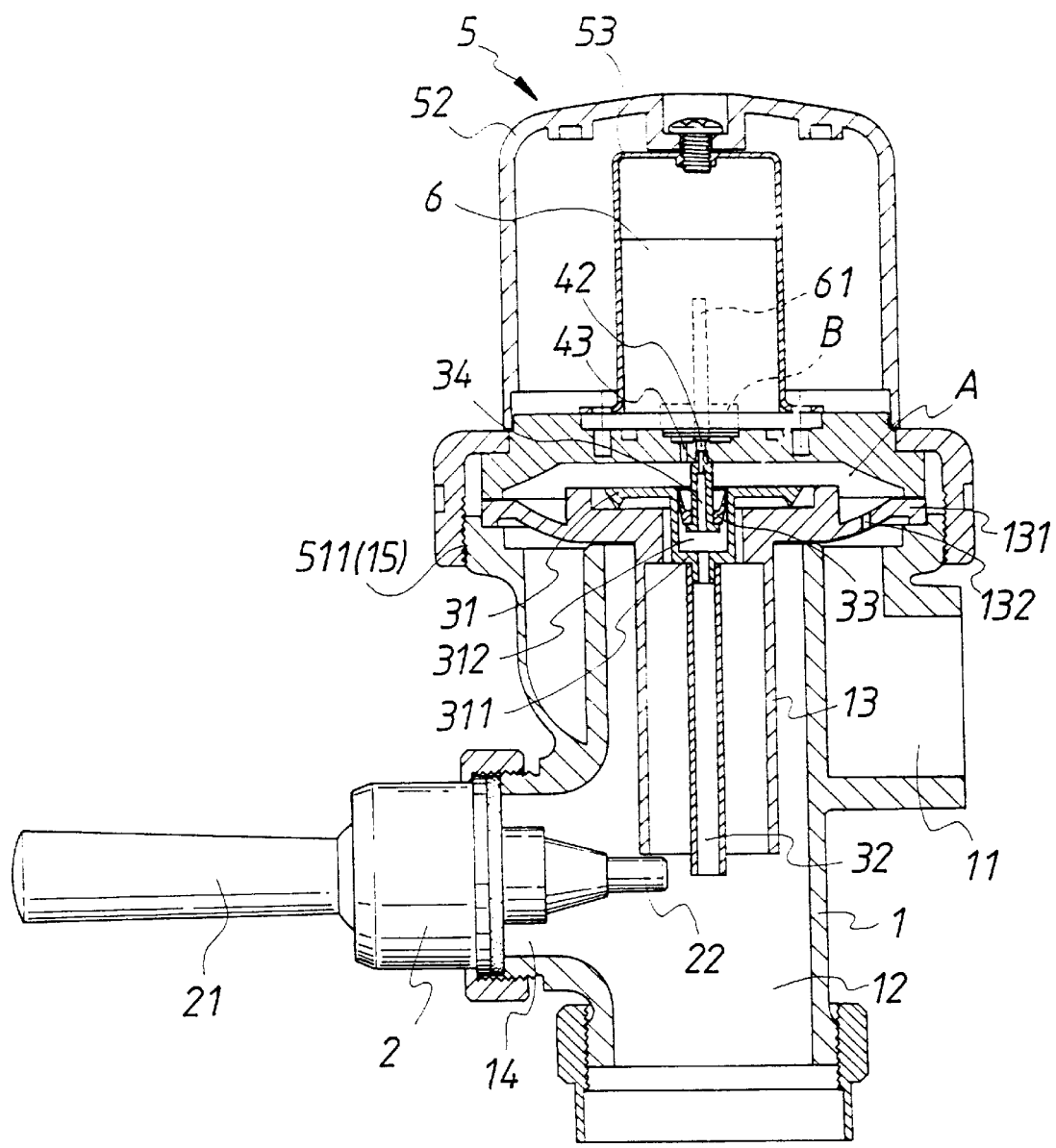
FIG. 4 is an assembled view of the manual and automatic flow control valve of the present invention.

Referring to FIGS. 2, 3 and 4, the manual and automatic flow control valve of the present invention includes a valve body 1, a manual control unit 2, a hollow pressure-releasing device 3, an interfacing plate 4, an upper casing 5, and a electric controlled magnetic unit 6.

The valve body 1 is a prior art flow control valve. One side of the valve is installed with a water inlet chamber 11 which is bent and then extends upwards. The lower side thereof is vertically installed with a water outlet chamber 12. An upper end of the water outlet chamber 12 vertically protrudes to the upper end of the water inlet chamber. The two chambers are communicated above an upper end of the valve body 1. A prior main water flow valve 13 is inserted into an upper end of the water outlet chamber 12. The main water flow valve 13 is a hollow cylinder made of plastics and an upper end thereof has a film 131 thereaound. At least one penetrating hole 132 is formed on the film. The film 131 runs across and seals the upper opening of the water outlet chamber 12 for separating the water outlet chamber 12 from water inlet chamber 11. An upper side thereof is formed with a lower pressure chamber A. A lower section of the water outlet chamber 12 has a sub-hole 14 for assembling the manual control unit 2. A periphery of the upper end of the valve 1 is formed with threads 15 for screwing other components.

The manual control unit 2 is a manual control device which can be pressed or moved for operating the spanner 21 at the outer end thereof. Thereby, the top rod 22 protruding in the inner end is telescopic. The structure about this is known in the prior art and thus the detail will not be described herein.

The hollow pressure-releasing device 3 (referring to FIG. 4) is formed by a valve piece 31, a hollow push rod 32, a drain-preventing washer 33 and a conduit 34. The valve piece 31 is like a disk and the bottom thereof has a post 311. A through hole 312 is formed at a center of the valve piece 31 and the post 311. The hollow push rod 32 is installed around the periphery of the post 311 at the bottom of the valve piece 31 and then extends downwards. The drain-preventing washer 33 is a V shape cylinder made of soft rubber material. The conduit 34 is a hollow tube and a bottom thereof has a protruded cap 341. Thereby, the conduit can pass through the bottom of the drain-preventing washer 33. The drain-preventing washer 33 is embedded in the via hole 312 in the upper end of the valve piece 31. Therefore, a hollow pressure-releasing device 3 for controlling the pressure of water-draining of the lower pressure chamber A is formed.

The middle plate 4 is a round-piece with thinner center portion. The lower space thereof is used as the lower pressure chamber A and the upper surface thereof has a post 41. A center of the post 41 is a concave upper pressure chamber B. A via hole 42 is vertically formed in the center portion of the upper pressure chamber B. A lateral side of the via hole 42 is formed with at least one small hole 43 so that the lower pressure chamber A and the upper pressure chamber B are communicatable with one another.

The upper casing 5 is formed by a fixing toggle 51, a housing 52 and a retaining rack 53. The fixing toggle 51 has a shape like a round cap. The inner annular wall thereof has inner threads 511. The housing 52 is a cylinder and can be directly formed upon or separates from the fixing toggle 51. One side thereof can be formed with a through hole 521 for embedding with a prior art sensor. The internal thereof can be installed with batteries, circuit boards and other electronic elements. The retaining rack 53 has an annular U shape structure made of metal for retaining the electric controlled magnetic unit 6 which will be described hereinafter.

The electric controlled magnetic unit 6 is one known in the prior art. The bottom of the electric controlled magnetic unit 6 has a top rod 61 which is electromagnetically controlled so as to telescopically move.

Thereby, as shown in the FIGS. 3 and 4, the manual control unit 2 can be screwed into the outer end of the sub-hole 14 of the valve body 1 so that the inner top rod 22 extends to the bottom of the main water flow valve 13. The hollow push rod 32 on the bottom of the hollow pressure-releasing device 3 is inserted into the main water flow valve 13 so that the upper valve piece 31 exactly seals the hole of the main water flow valve 13. The middle plate 4 covers the film 131 of the main water flow valve 13. The conduit 34 at the upper end of the hollow pressure-releasing device 3 inserts into the via hole 42 of the middle plate 4 so that the upper pressure chamber B is communicated with the hollow push rod 32 and the water outlet chamber 12 through the conduit 34. Thereby, the electric controlled magnetic unit 6 is firmly secured to the middle plate 4 so that the top rod 61 exactly resists against the opening of the via hole 42. The fixing toggle 51 of the upper casing 5 presses upon the middle plate 4 and is screwed to the valve body 1. Thereby, the casing 52 covers the upper end of the fixing toggle 51. As a result, the manual and automatic flow control valve of the present invention is formed.

Figure 5:
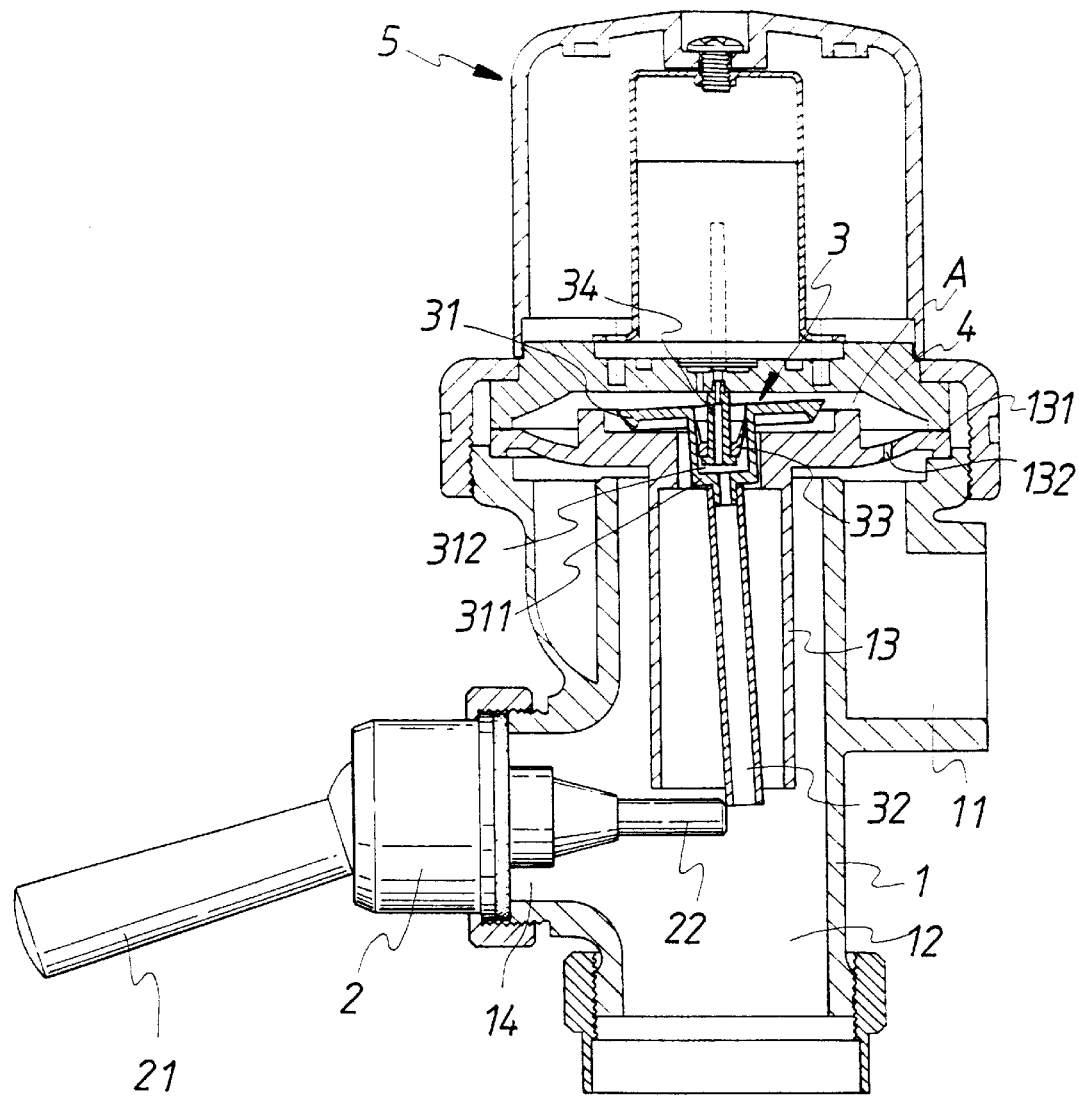
FIG. 5 is a schematic view showing the operation of the manual flush of the present invention.
Figure 6:
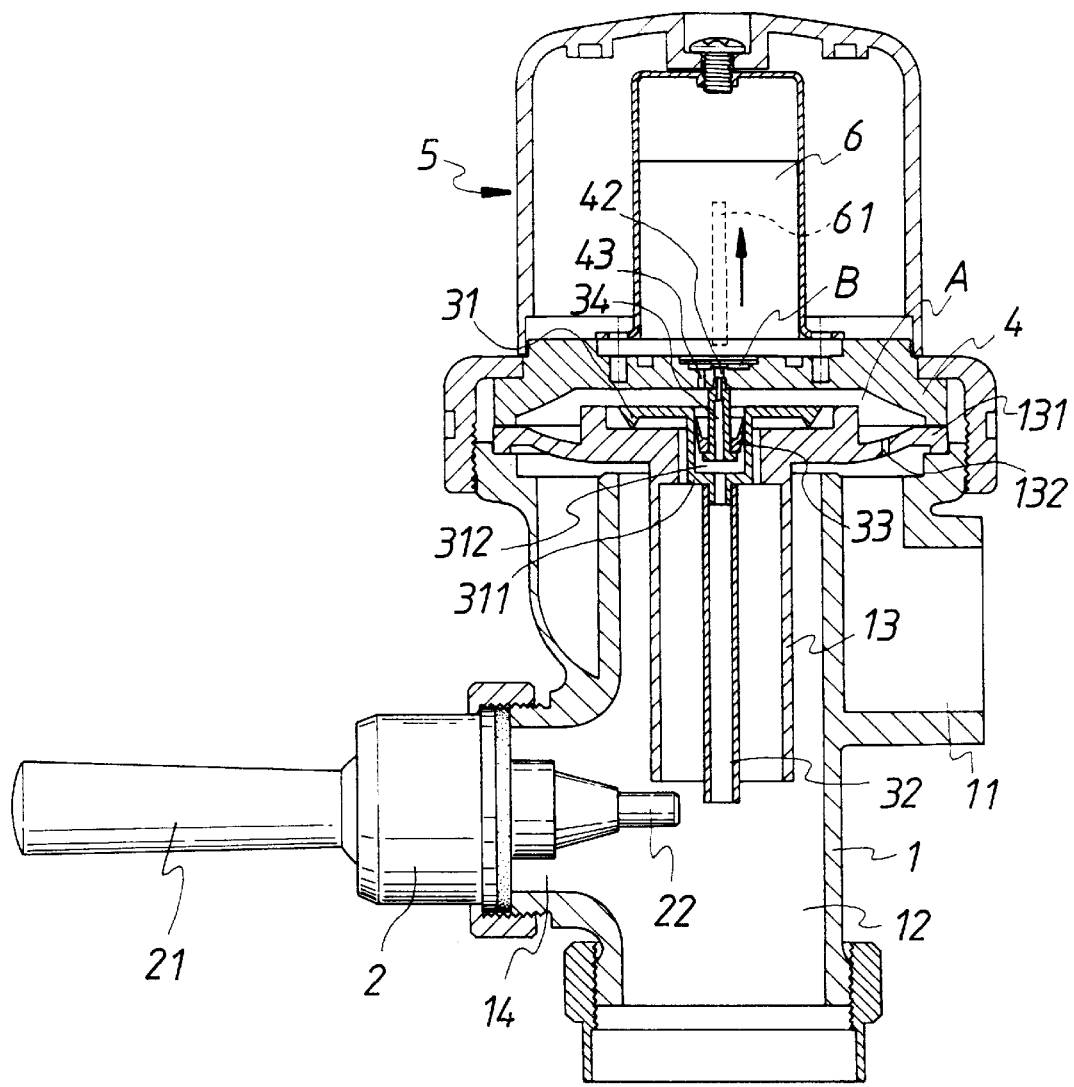
FIG. 6 is a schematic view showing the operation of the flush of the present invention.

The control principle of the present invention will be described herein. Referring to FIG. 4, water flow of the water inlet chamber 11 of the valve body 1 may flow through the penetrating hole 132 of the main water flow valve 13 and the small hole 43 of the middle plate 4 so as to fully fill the lower pressure chamber A and the upper pressure chamber B. By the balance of the water pressures of the lower pressure chamber A and the upper pressure chamber B, the film 131 of the main water flow valve 13 can be retained to cover the upper opening of the water outlet chamber 12. With reference to FIG. 5 when the user presses the spanner 21 of the manual control unit 2, the top rod 22 may protrude forwards to push the hollow push rod 32 so that the hollow pressure-releasing device 3 will tilt. Thereby, the water in the lower pressure chamber A drains out from the main water flow valve 13 and thus the water pressure of the water inlet chamber 11 becomes too high so as to eject the film piece 131. If a large amount of water drains out from the water outlet chamber 12, the manual control effect can be achieved. Referring to FIG. 6, the automatic control of the flush of water will be described here. When the sensor actuates an electric controlled magnetic unit 6 so that the top rod 61 is reduced, water of the upper pressure chamber B can drain out through the via hole 42, conduit 34 and hollow push rod 32. Then when the water of the lower pressure chamber A flows through the small hole 43 to supply the upper pressure chamber B, the water pressure of water inlet chamber 11 will be too high and thus the film 131 is ejected and thus a large amount of water will drain out. Therefore, the object of auto-flush is achieved.

Next, to achieve the effect of half-auto flush control, in the present invention, the valve body 1 and manual control unit 2 are known in the prior art which can be seen in the manual flush urinal. Therefore, in the present invention, the hollow pressure-releasing device 3, middle plate 4, upper casing 5 and electric controlled magnetic unit 6 can be installed without detaching the valve body 1 and water tube so as to derive a manual and automatic flow control valve. Time and labor can be saved and thus cost is reduced. Therefore, the present invention can be used in the urinals of schools, hospitals, bus stations, departments, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A manual and automatic flow control valve comprising a valve body, a manual control unit, a hollow pressure-releasing device, an interfacing plate, an upper casing, and an electric controlled magnetic unit; wherein the valve body is a flow control valve; one side of the valve body is installed with a water inlet chamber which is bent and then extends upwards;

the lower side thereof is vertically installed with a water outlet chamber, an upper end of the water outlet chamber vertically protrudes to an upper end of the water inlet chamber; the water inlet chamber and water outlet chambers are communicated above an upper end of the valve body; a hollow main water flow valve is inserted into an upper end of the water outlet chamber, at least one penetrating hole is formed on the film; the film runs across and seals an upper opening of the water outlet chamber for separating the water outlet chamber and water inlet chamber; an upper side thereof is formed with a lower pressure chamber; a manual control unit is installed out of the water outlet chamber of the valve body; a bottom of the electric controlled magnetic unit is installed with a top rod which is controllable electromagnetically; characterized in that: the hollow pressure-releasing device is formed by a valve piece, a hollow push rod, a drain-preventing washer and a conduit; the valve piece is like a disk and the bottom of the valve piece has a post; a through hole is formed at a center of the valve piece and the post; the hollow push rod is installed around a periphery of the post at the bottom of the valve piece and then extends downwards; the drain-preventing washer is a V shape cylinder made of soft rubber material; the conduit is a hollow tube and a bottom thereof has a protruded cap;

thereby, the conduit can pass through the bottom of the drain-preventing washer, the drain-preventing washer is embedded in the via hole in the upper end of the valve piece; and the middle plate is a round-piece with a thinner center portion; the lower space thereof is used as the lower pressure chamber; a via hole is vertically formed in a center portion of the upper pressure chamber; a lateral side of the via hole is formed with at least one small hole so that the upper pressure chamber and the lower pressure chamber are communicated with one another;

wherein the hollow push rod on a bottom of the hollow pressure-releasing device is inserted into the main water flow valve so that the upper valve piece exactly seals an opening of the main water flow valve; the middle plate covers the film of the main water flow valve; the conduit at the upper end of the hollow pressure-releasing device inserts into the via hole of the middle plate so that the upper pressure chamber is communicated with the hollow push rod and the water outlet chamber by the conduit; and the electric controlled magnetic unit is firmly secured to the middle plate so that the top rod exactly resists against an opening of the via hole.

2. The manual and automatic flow control valve as claimed in claim 1, wherein the main water flow valve is a hollow cylinder made of plastics and an upper end thereof has a film thereaound; and at least one penetrating hole is formed on the film.

3. The manual and automatic flow control valve as claimed in claim 1, wherein the manual control unit is a manual control device which can be pressed or moved for operating the spanner at an outer end thereof; and the top rod protruding in the inner end is telescopic.

4. The manual and automatic flow control valve as claimed in claim 1, wherein the valve piece of the hollow pressure-releasing device is a disk and a bottom thereof has a post; and a center of the post has a via hole for being engaged with the hollow push rod.

5. The manual and automatic flow control valve as claimed in claim 1, wherein the upper casing is formed by a fixing toggle, a housing and a retaining rack; the fixing toggle has a shape like a round cap; an inner annular wall thereof has inner threads; the housing is a cylinder that is directly formed upon the fixing toggle; with one side thereof being installed with sensors; and the retaining rack has an annular U shape structure made of metal for retaining the electric controlled magnetic unit.

6. The manual and automatic flow control valve as claimed in claim 1, wherein the manual and automatic flow control valve is used in a flush device of a urinal.

7. The manual and automatic flow control valve as claimed in claim 1, wherein the manual and automatic flow control valve is used in a faucet.

\* \* \* \* \*